United States Patent
Dettinger et al.

(10) Patent No.: US 7,146,376 B2
(45) Date of Patent: *Dec. 5, 2006

(54) DATA ABSTRACTION MODEL DRIVEN PHYSICAL LAYOUT

(75) Inventors: Richard D. Dettinger, Rochester, MN (US); Frederick A. Kulack, Rochester, MN (US); Richard J. Stevens, Mantorville, MN (US); Eric W. Will, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 487 days.

This patent is subject to a terminal disclaimer.

(21) Appl. No.: 10/422,884

(22) Filed: Apr. 24, 2003

(65) Prior Publication Data

US 2004/0215629 A1    Oct. 28, 2004

(51) Int. Cl.
*G06F 17/30* (2006.01)
(52) U.S. Cl. ............... 707/102; 707/100; 707/101; 707/103 R; 707/104.1
(58) Field of Classification Search ............... 707/100, 707/101, 102, 103 R, 104.1
See application file for complete search history.

(56) References Cited

U.S. PATENT DOCUMENTS

| | | | | |
|---|---|---|---|---|
| 4,991,087 A | * | 2/1991 | Burkowski et al. ............ | 707/3 |
| 5,321,813 A | * | 6/1994 | McMillen et al. ............ | 714/798 |
| 5,909,550 A | * | 6/1999 | Shankar et al. ............ | 709/227 |
| 6,360,536 B1 | * | 3/2002 | Prabhu et al. ............ | 60/419 |
| 6,477,572 B1 | * | 11/2002 | Elderton et al. ............ | 709/224 |
| 6,647,381 B1 | * | 11/2003 | Li et al. ............ | 707/3 |
| 6,725,227 B1 | | 4/2004 | Li | |
| 6,867,788 B1 | * | 3/2005 | Takeda ............ | 345/630 |
| 6,928,431 B1 | * | 8/2005 | Dettinger et al. ............ | 707/3 |
| 6,928,554 B1 | * | 8/2005 | Dettinger et al. ............ | 713/165 |
| 2002/0002662 A1 | * | 1/2002 | Olarig et al. ............ | 711/167 |

FOREIGN PATENT DOCUMENTS

WO         WO 9406091 A1 *   3/1994

OTHER PUBLICATIONS

Dettinger et al., IBM U.S. Appl. No. 10/083,075 (ROC920020044US1), filed Feb. 26, 2002, "Improved Application Portability and Extensibility Through Database Schema and Query Abstraction".

* cited by examiner

*Primary Examiner*—Frantz Coby
(74) *Attorney, Agent, or Firm*—Patterson & Sheridan, LLP

(57) ABSTRACT

A method, system and article of manufacture for accessing data in a database independent of the particular manner in which the data is physically represented and for modeling a physical representation of the data in the database for architecting a relationship between the physical representation of the data in the database and a logical representation of the data. One embodiment provides a method for architecting a relationship between a physical representation of data in a database and a logical representation of the data. The method comprises providing the logical representation defining logical fields; and then providing, on the basis of the logical representation, the physical representation for the data, whereby the logical fields defined by the logical representation provide an abstract view of the data and map logical fields of abstract queries to respective data in the database.

25 Claims, 10 Drawing Sheets

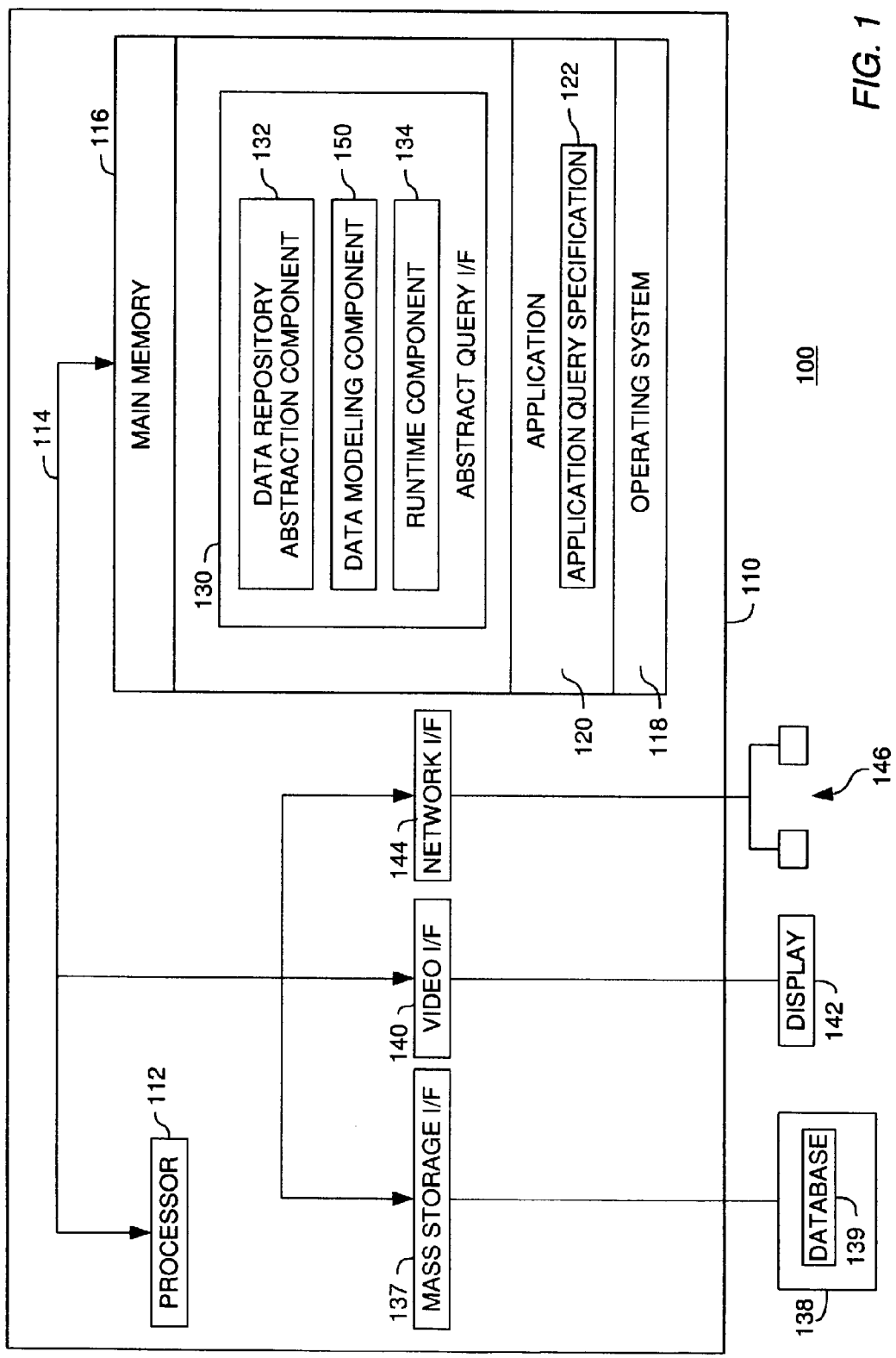

DATA ABSTRACTION MODEL DRIVEN PHYSICAL LAYOUT

CROSS-RELATED APPLICATION

This application is related to the following commonly owned application: U.S. patent application Ser. No. 10/083,075, filed Feb. 22, 2002, entitled "IMPROVED APPLICATION FLEXIBILITY THROUGH DATABASE SCHEMA AND QUERY ABSTRACTION", which is hereby incorporated herein in its entirety.

BACKGROUND OF THE INVENTION

1. Field of the Invention

The present invention generally relates to data processing and more particularly to modeling a physical representation of data in a database.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses.

Regardless of the particular architecture, in a DBMS, a requesting entity (e.g., an application or the operating system) demands access to a specified database by issuing a database access request. Such requests may include, for instance, simple catalog lookup requests or transactions and combinations of transactions that operate to read, change and add specified records in the database. These requests are made using high-level query languages such as the Structured Query Language (SQL) in the case of a relational database. Illustratively, SQL is used to make interactive queries for getting information from and updating a database such as International Business Machines' (IBM) DB2, Microsoft's SQL Server, and database products from Oracle, Sybase, and Computer Associates. The term "query" denominates a set of commands for retrieving data from a stored database. Queries take the form of a command language that lets programmers and programs select, insert, update, find out the location of data in a database, and so forth.

In commonly assigned U.S. patent application Ser. No. 10/083,075 (the '075 application), filed Feb. 22, 2002 entitled "Improved Application Flexibility Through Database Schema and Query Abstraction", a framework was disclosed for logically viewing physical data. The framework of the '075 application provided a requesting entity (i.e., an end-user or application) with an abstract representation of physical data. In this way, the requesting entity is decoupled from the underlying physical data to be accessed. Logical queries based on the framework can be constructed without regard for the makeup of the physical data. Further, changes to the physical data do not necessitate changes to applications accessing the physical data.

One difficulty when dealing with an abstract view of data is properly tuning the underlying data storage for optimal performance or size. Initially, it may be thought that existing data modeling tools may be used to advantage in this regard. Data modeling tools for the creation and maintenance of databases are well known. Generally, data modeling tools usually present the user with a graphical user interface that allows database designers to model entities, relationships between these entities, constraints like participation constraints, cardinality of relationships and other aspects such as weak entities, key attributes, composite attributes, identifying relationships, etc. However, while existing data modeling tools can help to build a database and can give suggestions for how to change a corresponding physical data storage model based on particular queries, they are not suitable for properly tuning the physical data storage where the physical data is abstractly presented/modeled.

Therefore, there is a need for an improved and more flexible method for modeling physical data in a database in which the data is viewed abstractly.

SUMMARY OF THE INVENTION

The present invention generally is directed to a method, system and article of manufacture for modeling a physical representation of data in a database and for architecting a relationship between the physical representation of the data in the database and a logical representation of the data. The modeling and architecting may be embodied as an abstract framework through which the data may then be accessed independent of the particular manner in which the data is physically represented.

One embodiment for architecting a relationship between a physical representation of data in a database and a logical representation of the data, comprises providing the logical representation defining logical fields; and then providing, on the basis of the logical representation, the physical representation for the data, whereby the logical fields defined by the logical representation provide an abstract view of the data and map logical fields of abstract queries to respective data in the database.

Another embodiment provides a method for architecting a relationship between a physical representation of data in a database and a logical representation of the data, wherein the physical representation has a plurality of physical entities representing related data in the database. The method for architecting comprises providing a logical representation defining logical fields, each logical field describing physical location properties of a physical data entity to be associated with the logical field; for each logical field, determining the physical location properties of the physical data entity to be associated with the logical field and providing a data structure on the basis of the determined physical location properties; and associating the provided data structures with the physical representation.

Still another embodiment provides a computer readable medium containing a program which, when executed, performs an operation of architecting a relationship between a physical representation of data in a database and a logical representation of the data. The operation comprises analyzing the logical representation defining logical fields, each logical field providing an abstract view of related data to users and adapted for mapping logical fields of abstract queries to respective data in the database and generating, on the basis of the logical representation, the physical representation for the data.

Still another embodiment provides a computer readable medium containing a program which, when executed, performs an operation of architecting a relationship between a physical representation of data in a database and a logical representation of the data, the physical representation having a plurality of physical entities representing related data in the database. The operation comprises, for each logical field of a logical representation defining logical fields describing physical location properties of a data structure of a physical data entity to be associated with the logical field: determining the physical location properties and generating the data structure on the basis of the determined physical location properties; and associating the generated data structures with the physical representation.

Still another embodiment provides a computer, comprising a database for storing data; and a data modeling component for architecting a relationship between a physical representation of the data in the database and a logical representation of the data, the logical representation defining logical fields, each logical field providing an abstract view of related data in the database to users and mapping logical fields of abstract queries to respective related data in the database, and for generating, on the basis of the logical data representation, a physical representation for the data.

Still another embodiment provides a computer, comprising a database for storing data and a data modeling component for architecting a relationship between a physical representation of the data in the database and a logical representation of the data, the logical representation defining logical fields, each logical field describing physical location properties of a physical entity to be associated with the logical field, and the physical representation having a plurality of data structures associated with physical data entities representing related data in the database. The architecting comprises determining, for each logical field, the properties of the data structure to be associated with the logical field; generating a data structure on the basis of the determined physical location properties; and associating the generated data structures with the physical representation.

Still another embodiment provides a logical framework for modeling a data repository, the logical framework residing in memory and comprising a data model and a data modeling component. The data model comprises a plurality of logical fields providing a logical view of data, the logical fields each comprising physical location properties defining a location of a data item and an access method configured to access the data item according to the physical location properties; and metadata defining relation information for relating at least a portion of the data. The data modeling component is configured for architecting, according to the data model, a relationship between a physical representation of the data and a logical representation of the data as defined by the plurality of logical fields, whereby the plurality of logical fields are each mapped to respective data items of the data.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 1 is a computer system illustratively utilized in accordance with the invention;

DETAILED DESCRIPTION OF THE PREFERRED EMBODIMENTS

Figure 2A:
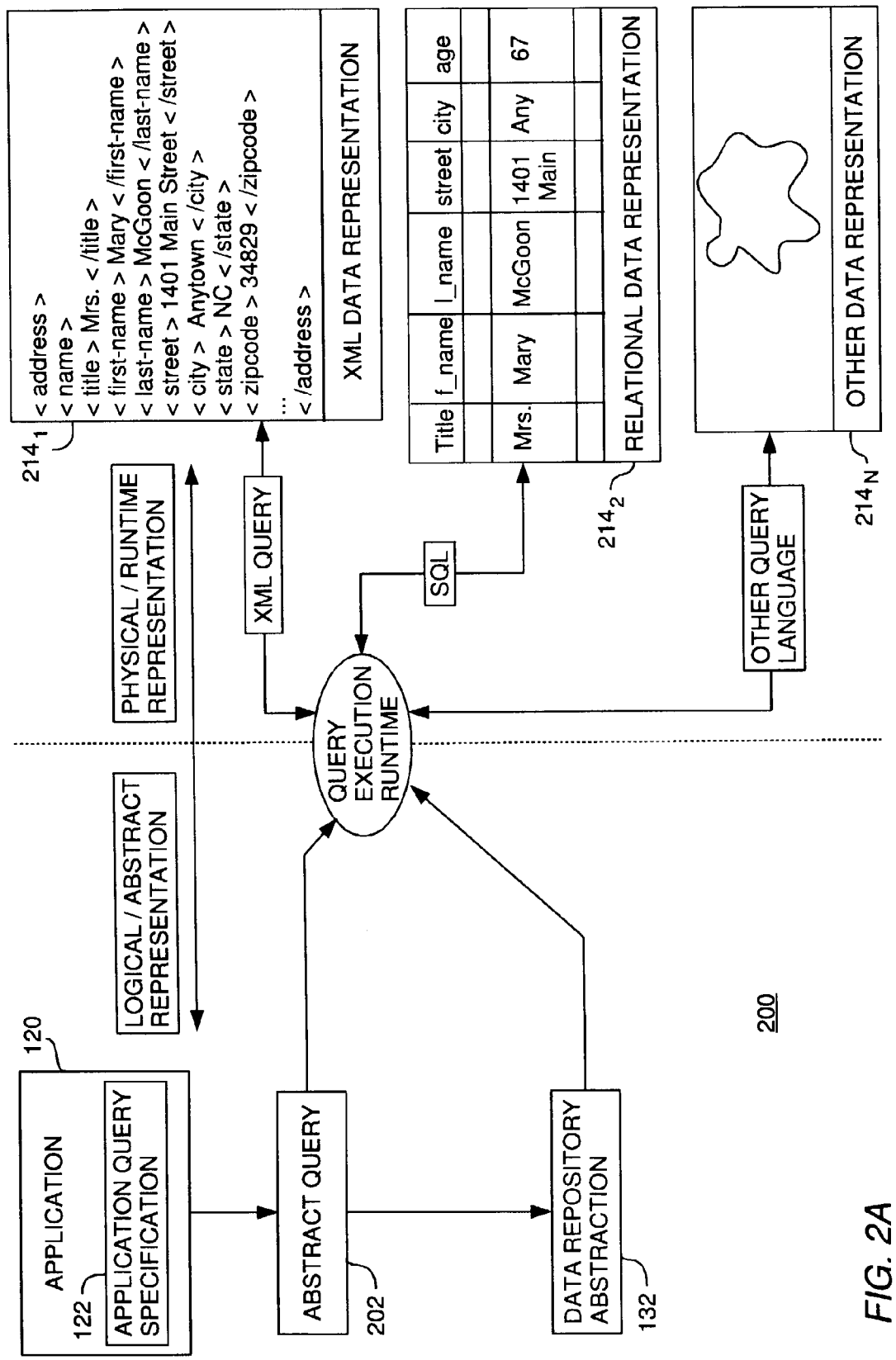
FIGS. 2A–B is a relational view of software components of one embodiment of the invention.

The present invention generally is directed to a system, method and article of manufacture for modeling a physical representation of data in a database and in particular to a system, method and article of manufacture for architecting a relationship between a physical representation of data in a database and a logical representation of the data. In one embodiment, the logical representation defines a plurality of logical fields. On the basis of the logical representation, the physical representation for the data is provided, whereby the logical fields defined by the logical representation provide an abstract view of the data to users.

Terminology and Definitions

For clarity, the following terminology and definitions will be used to characterize features of the preferred embodiments for modeling a physical representation of data in a database. However, the terminology and definitions are only intended to clarify the description and to simplify the understanding thereof, but not to limit the present invention to these particular definitions:

(i) a physical entity of data (interchangeably referred to as a physical data entity) refers to a data item in an underlying database as, e.g., the data included in a database table or in a column of the database table, i.e., to the data itself;

(ii) a data structure refers to a physical arrangement of data associated with one or more physical entities of the data in the database such as, e.g., an arrangement in the form of a database table or a column of the database table;

(iii) a physical representation of data in a database refers to an organizational schema of the data in the database as, e.g., a relational schema, and may be composed of a plurality of data structures;

(iv) a logical field refers to an abstract view of data whether as an individual data item or a collection of data in the form of, for example, a database table;

(v) a logical representation refers to an abstract view of a physical representation of data and may be composed of a plurality of logical fields; and (vi) an abstract query refers to a query that is defined using one or more logical fields and needs to be transformed into a query consistent with the physical representation of data in a database in order to be executed against the database.

Preferred Embodiments

One embodiment of the invention is implemented as a program product for use with a computer system such as, for example, the computer system 100 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

Referring now to FIG. 1, a computing environment 100 is shown. In general, the distributed environment 100 includes a computer system 110 and a plurality of networked devices 146. The computer system 110 may represent any type of computer, computer system or other programmable electronic device, including a client computer, a server computer, a portable computer, an embedded controller, a PC-based server, a minicomputer, a midrange computer, a mainframe computer, and other computers adapted to support the methods, apparatus, and article of manufacture of the invention. In one embodiment, the computer system 110 is an eServer iSeries 400 available from International Business Machines of Armonk, N.Y.

Illustratively, the computer system 110 comprises a networked system. However, the computer system 110 may also comprise a standalone device. In any case, it is understood that FIG. 1 is merely one configuration for a computer system. Embodiments of the invention can apply to any comparable configuration, regardless of whether the computer system 100 is a complicated multi-user apparatus, a single-user workstation, or a network appliance that does not have non-volatile storage of its own.

The embodiments of the present invention may also be practiced in distributed computing environments in which tasks are performed by remote processing devices that are linked through a communications network. In a distributed computing environment, program modules may be located in both local and remote memory storage devices. In this regard, the computer system 110 and/or one or more of the networked devices 146 may be thin clients which perform little or no processing.

The computer system 110 could include a number of operators and peripheral systems as shown, for example, by a mass storage interface 137 operably connected to a direct access storage device 138, by a video interface 140 operably connected to a display 142, and by a network interface 144 operably connected to the plurality of networked devices 146. The display 142 may be any video output device for outputting viewable information.

Computer system 110 is shown comprising at least one processor 112, which obtains instructions and data via a bus 114 from a main memory 116. The processor 112 could be any processor adapted to support the methods of the invention.

The main memory 116 is any memory sufficiently large to hold the necessary programs and data structures. Main memory 116 could be one or a combination of memory devices, including Random Access Memory, nonvolatile or backup memory, (e.g., programmable or Flash memories, read-only memories, etc.). In addition, memory 116 may be considered to include memory physically located elsewhere in a computer system 110, for example, any storage capacity used as virtual memory or stored on a mass storage device (e.g., direct access storage device 138) or on another computer coupled to the computer system 110 via bus 114.

The memory 116 is shown configured with an operating system 118. The operating system 118 is the software used for managing the operation of the computer system 100. Examples of the operating system 118 include IBM OS/400®, UNIX, Microsoft Windows®, and the like.

The memory 116 further includes one or more applications 120 and an abstract query interface 130. The applications 120 and the abstract query interface 130 are software products comprising a plurality of instructions that are resident at various times in various memory and storage devices in the computer system 100. When read and executed by one or more processors 112 in the computer system 100, the applications 120 and the abstract query interface 130 cause the computer system 100 to perform the steps necessary to execute steps or elements embodying the various aspects of the invention. The applications 120 (and more generally, any requesting entity, including the operating system 118) are configured to issue queries against a database 139 (shown in storage 138). The database 139 is representative of any collection of data regardless of the particular physical representation of the data. By way of illustration, the database 139 may be organized according to a relational schema (accessible by SQL queries) or according to an XML schema (accessible by XML queries). However, the invention is not limited to a particular schema and contemplates extension to schemas presently unknown. As used herein, the term "schema" generically refers to a particular arrangement of data.

The queries issued by the applications 120 are defined according to an application query specification 122 included with each application 120. The queries issued by the applications 120 may be predefined (i.e., hard coded as part of the applications 120) or may be generated in response to input (e.g., user input). In either case, the queries (referred to herein as "abstract queries") are composed using logical fields defined by the abstract query interface 130. In particular, the logical fields used in the abstract queries are defined by a data repository abstraction component 132 of the abstract query interface 130. The abstract queries are executed by a runtime component 134 which transforms the abstract queries into a form consistent with the physical representation of the data contained in the database 139. The physical representation of the data contained in the database 139 can be modeled by a data modeling component 150 of the abstract query interface 130. The data modeling component 150 reads the logical fields defined by the data repository abstraction component 132 and models the physical representation of the data according to predefined rules for architecting a relationship between the physical representation and the logical representation of the data as defined by the logical fields. Furthermore, the data modeling component 150 modifies the logical fields according to predefined rules if such modification is required subsequent to modeling the physical representation. Illustratively, the data modeling component 150 is shown as included in the abstract query interface 130. However, the data modeling component 150 may alternatively be implemented as a separate component or, still alternatively, as one of the applications 120. The application query specification 122 and the abstract query interface 130 are further described with reference to FIG. 2.

Figure 2B:
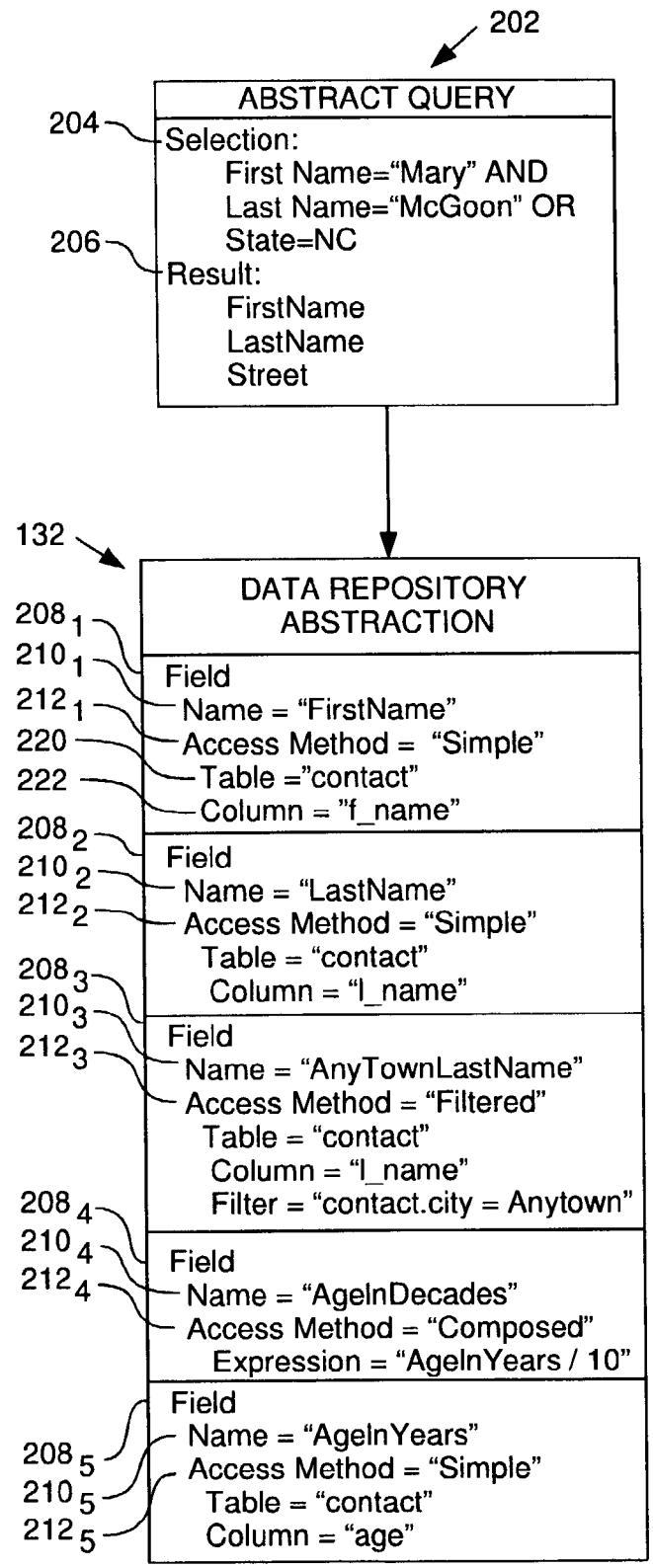

FIGS. 2A–B show an illustrative relational view 200 of components of the invention. The data repository abstraction component 132 defines logical fields corresponding to physical entities of data in a database (e.g., database 139), thereby providing a logical representation of the data. The physical entities of the data are arranged in the database according to a physical representation of the data. The physical representation is modeled on the basis of the logical representation, as described with reference to FIG. 5 below. Using the logical representation of the data, an application query specification 122 specifies one or more logical fields to compose an abstract query 202. The requesting entity (e.g., one of the applications 120) issues the query 202 as defined by the respective application query specification 122 of the requesting entity.

The resulting query 202 is generally referred to herein as an "abstract query" because the query is composed according to abstract (i.e., logical) fields rather than by direct reference to the underlying physical data entities in the database 139. As a result, abstract queries may be defined that are independent of the particular underlying physical data representation used. In one embodiment, the application query specification 122 may include both criteria used for data selection (selection criteria 204) and an explicit specification of the fields to be returned (return data specification 206) based on the selection criteria 204. For execution, the abstract query 202 is transformed into a query consistent with the underlying physical representation of the data using the data repository abstraction component 132.

In general, the data repository abstraction component 132 exposes information as a set of logical fields that may be used within a query (e.g., the abstract query 202) issued by the application 120 to specify criteria for data selection and specify the form of result data returned from a query operation. The logical fields are defined independently of the underlying phsyical representation being used in the database 139, thereby allowing queries to be formed that are loosely coupled to the underlying physical representation.

In one embodiment, the data repository abstraction component 132 comprises a plurality of field specifications $208_1$, $208_2$, $208_3$, $208_4$ and $208_5$ (five shown by way of example), collectively referred to as the field specifications 208. Specifically, a field specification is provided for each logical field available for composition of an abstract query. Each field specification may contain one or more attributes. Illustratively, the field specifications 208 include a logical field name attribute $210_1$, $210_2$, $210_3$, $210_4$, $210_5$ (collectively, field name 210) and an associated access method attribute $212_1$, $212_2$, $212_3$, $212_4$, $212_5$ (collectively, access method 212). Each attribute may have a value. For example, logical field name attribute $210_1$ has the value "FirstName" and access method attribute $212_1$ has the value "Simple". Furthermore, each attribute may include one or more associated abstract properties. Each abstract property describes a characteristic of a data structure and has an associated value. In the context of the invention, a data structure refers to a part of the underlying physical representation that is defined by one or more physical entities of the data corresponding to the logical field. In particular, an abstract property may represent a physical location property abstractly describing a location of a physical data entity corresponding to the data structure, like a name of a database table or a name of a column in a database table. Illustratively, the access method attribute 212, includes physical location properties 220 "Table" and 222 "Column". Furthermore, physical location property 220 "Table" has the value "contact" and physical location property 222 "Column" has the value "f_name". Accordingly, assuming an underlying relational database schema in the present example, the values of physical location properties 220 and 222 point to a table "contact" having a column "f_name".

The access methods generally associate (i.e., map) the logical field names to a data structure $214_1$, $214_2$ ... $214_N$ in the database (e.g., database 139). By way of illustration, two data representations are shown, an XML data representation $214_1$ and a relational data representation $214_2$. However, the physical representation $214_N$ indicates that any other data representation, known or unknown, is contemplated. In one embodiment, a single data repository abstraction component 132 contains field specifications (with associated access methods) for two or more physical representations 214. In an alternative embodiment, a different single data repository abstraction component 132 is provided for each separate physical representation 214.

Any number of access methods is contemplated depending upon the number of different types of logical fields to be supported. In one embodiment, access methods for simple fields, filtered fields and composed fields are provided. The field specifications $208_1$, $208_2$ and $208_5$ exemplify simple field access methods $212_1$, $212_2$, and $212_5$, respectively. Simple fields are mapped directly to a particular entity in the underlying physical representation (e.g., a field mapped to a given database table and column). By way of illustration, as described above, the simple field access method $212_1$ shown in FIG. 2B maps the logical field name $210_1$ ("FirstName") to a column named "f_name" in a table named "contact". The field specification $208_3$ exemplifies a filtered field access method $212_3$. Filtered fields identify an associated physical entity and provide filters used to define a particular subset of items within the physical representation. An example is provided in FIG. 2B in which the filtered field access method $212_3$ maps the logical field name $210_3$ ("AnyTownLastName") to a physical entity in a column named "l_name" in a table named "contact" and defines a filter for individuals in the city of "Anytown". Another example of a filtered field is a New York ZIP code field that maps to the physical representation of ZIP codes and restricts the data only to those ZIP codes defined for the state of New York. The field specification $208_4$ exemplifies a composed field access method $212_4$. Composed access methods compute a logical field from one or more physical fields using an expression supplied as part of the access method definition. In this way, information which does not exist in the underlying physical data representation may be computed. In the example illustrated in FIG. 2B the composed field access method 2124 maps the logical field name $210_4$ "AgeInDecades" to "AgeInYears/10". Another example is a sales tax field that is composed by multiplying a sales price field by a sales tax rate.

It is contemplated that the formats for any given data type (e.g., dates, decimal numbers, etc.) of the underlying data may vary. Accordingly, in one embodiment, the field specifications 208 include a type attribute which reflects the format of the underlying data. However, in another embodiment, the data format of the field specifications 208 is different from the associated underlying physical data, in which case a conversion of the underlying physical data into the format of the logical field is required.

By way of example, the field specifications 208 of the data repository abstraction component 132 shown in FIG. 2 are representative of logical fields mapped to data represented in the relational data representation 2142. However, other instances of the data repository extraction component 132 map logical fields to other physical representations, such as XML.

An illustrative abstract query corresponding to the abstract query 202 shown in FIG. 2B is shown in Table I below. By way of illustration, the illustrative abstract query is defined using XML. However, any other language may be used to advantage.

tion criteria and a results specification (lines 015–019). In one embodiment, a selection criterion consists of a field name (for a logical field), a comparison operator (=, >, <, etc) and a value expression (what is the field being compared to). In one embodiment, result specification is a list of abstract fields that are to be returned as a result of query execution. A result specification in the abstract query may consist of a field name and sort criteria.

An illustrative Data Repository Abstraction 132 is shown in Table II below. By way of illustration, the illustrative Data Repository Abstraction 132 is defined using XML. However, any other language may be used to advantage.

TABLE I

ABSTRACT QUERY EXAMPLE

```
001  <?xml version="1.0"?>
002  <!--Query string representation: (FirstName = "Mary" AND LastName =
003  "McGoon") OR State = "NC"-->
004  <QueryAbstraction>
005     <Selection>
006        <Condition internalID="4">
007           <Condition field="FirstName" operator="EQ" value="Mary"
008  internalID="1"/>
009           <Condition field="LastName" operator="EQ" value="McGoon"
010  internalID="3" relOperator="AND"></Condition>
011        </Condition>
012        <Condition field="State" operator="EQ" value="NC" internalID="2"
013  relOperator="OR"></Condition>
014     </Selection>
015     <Results>
016           <Field name="FirstName"/>
017           <Field name="LastName"/>
018           <Field name="Street"/>
019     </Results>
020  </QueryAbstraction>
```

Illustratively, the abstract query shown in Table I includes a selection specification (lines 005–014) containing selec-

TABLE II

DATA REPOSITORY ABSTRACTION EXAMPLE

```
001  <?xml version="1.0"?>
002  <DataRepository>
003   <Category name="Demographic">
004     <Field queryable="Yes" name="FirstName" displayable="Yes">
005        <AccessMethod>
006           <Simple columnName="f_name" tableName="contact"></Simple>
007        </AccessMethod>
008        <Type baseType="char"></Type>
009     </Field>
010     <Field queryable="Yes" name="LastName" displayable="Yes">
011        <AccessMethod>
012           <Simple columnName="l_name" tableName="contact"></Simple>
013        </AccessMethod>
014        <Type baseType="char"></Type>
015     </Field>
016     <Field queryable="Yes" name="State" displayable="Yes">
017        <AccessMethod>
018           <Simple columnName="state" tableName="contact"></Simple>
019        </AccessMethod>
020        <Type baseType="char"></Type>
021     </Field>
022   </Category>
023  </DataRepository>
```

Note that lines 004–009 correspond to the first field specification $208_1$ of the DRA 148 shown in FIG. 2B and lines 010–015 correspond to the second field specification $208_2$. For brevity, the other field specifications defined in Table I have not been shown in FIG. 2B. Note also that Table I illustrates a category, in this case "Demographic". A category is a grouping of one or more logical fields. In the present example, "First Name", "Last Name" and "State" are logical fields belonging to the common category, "Demographic".

Figure 3:
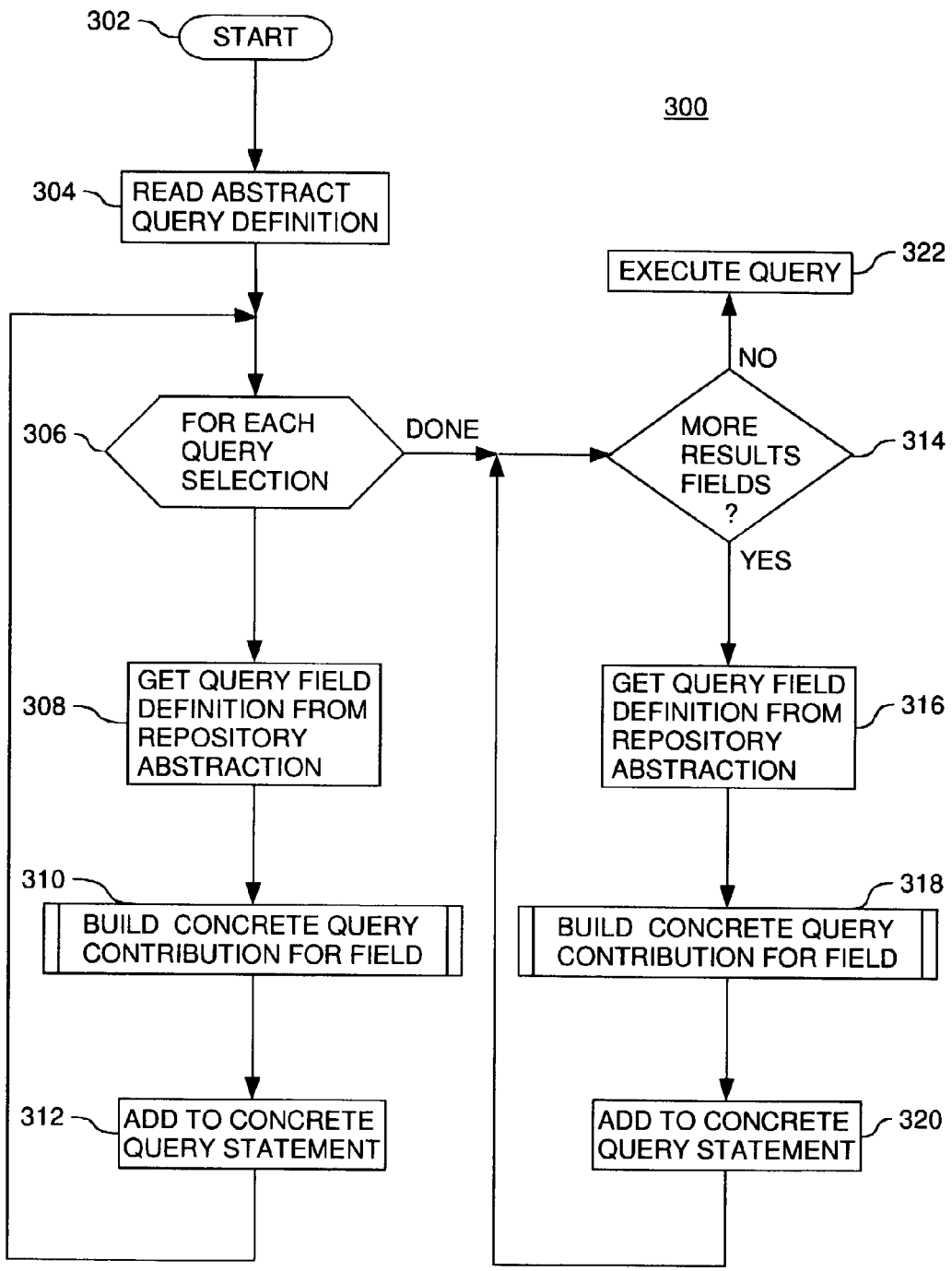
FIGS. 3–4 are flow charts illustrating the operation of a runtime component.

FIG. 3 shows an illustrative runtime method 300 exemplifying one embodiment of the operation of the runtime component 134. The method 300 is entered at step 302 when the runtime component 134 receives as input an instance of an abstract query (such as the abstract query 202 shown in FIG. 2). At step 304, the runtime component 134 reads and parses the instance of the abstract query and locates individual selection criteria and desired result fields. At step 306, the runtime component 134 enters a loop (comprising steps 306, 308, 310 and 312) for processing each query selection criteria statement present in the abstract query, thereby building a data selection portion of a Concrete Query. In one embodiment, a selection criterion consists of a field name (for a logical field), a comparison operator (=, >, <, etc) and a value expression (what is the field being compared to). At step 308, the runtime component 134 uses the field name from a selection criterion of the abstract query to look up the definition of the field in the data repository abstraction 132. As noted above, the field definition includes a definition of the access method used to access the physical data associated with the field. The runtime component 134 then builds (step 310) a Concrete Query Contribution for the logical field being processed. As defined herein, a Concrete Query Contribution is a portion of a concrete query that is used to perform data selection based on the current logical field. A concrete query is a query represented in languages like SQL and XML Query and is consistent with the data of a given physical data repository (e.g., a relational database or XML repository). Accordingly, the concrete query is used to locate and retrieve data from the physical data repository, represented by the database 139 shown in FIG. 1. The Concrete Query Contribution generated for the current field is then added to a Concrete Query Statement. The method 300 then returns to step 306 to begin processing for the next field of the abstract query. Accordingly, the process entered at step 306 is iterated for each data selection field in the abstract query, thereby contributing additional content to the eventual query to be performed.

After building the data selection portion of the concrete query, the runtime component 134 identifies the information to be returned as a result of query execution. As described above, in one embodiment, the abstract query defines a list of abstract fields that are to be returned as a result of query execution, referred to herein as a result specification. A result specification in the abstract query may consist of a field name and sort criteria. Accordingly, the method 300 enters a loop at step 314 (defined by steps 314, 316, 318 and 320) to add result field definitions to the concrete query being generated. At step 316, the runtime component 134 looks up a result field name (from the result specification of the abstract query) in the data repository abstraction 132 and then retrieves a Result Field Definition from the data repository abstraction 132 to identify the physical location of data to be returned for the current logical result field. The runtime component 134 then builds (at step 318) a Concrete Query Contribution (of the concrete query that identifies physical location of data to be returned) for the logical result field. At step 320, the Concrete Query Contribution is then added to the Concrete Query Statement. Once each of the result specifications in the abstract query has been processed, the query is executed at step 322.

Figure 4:
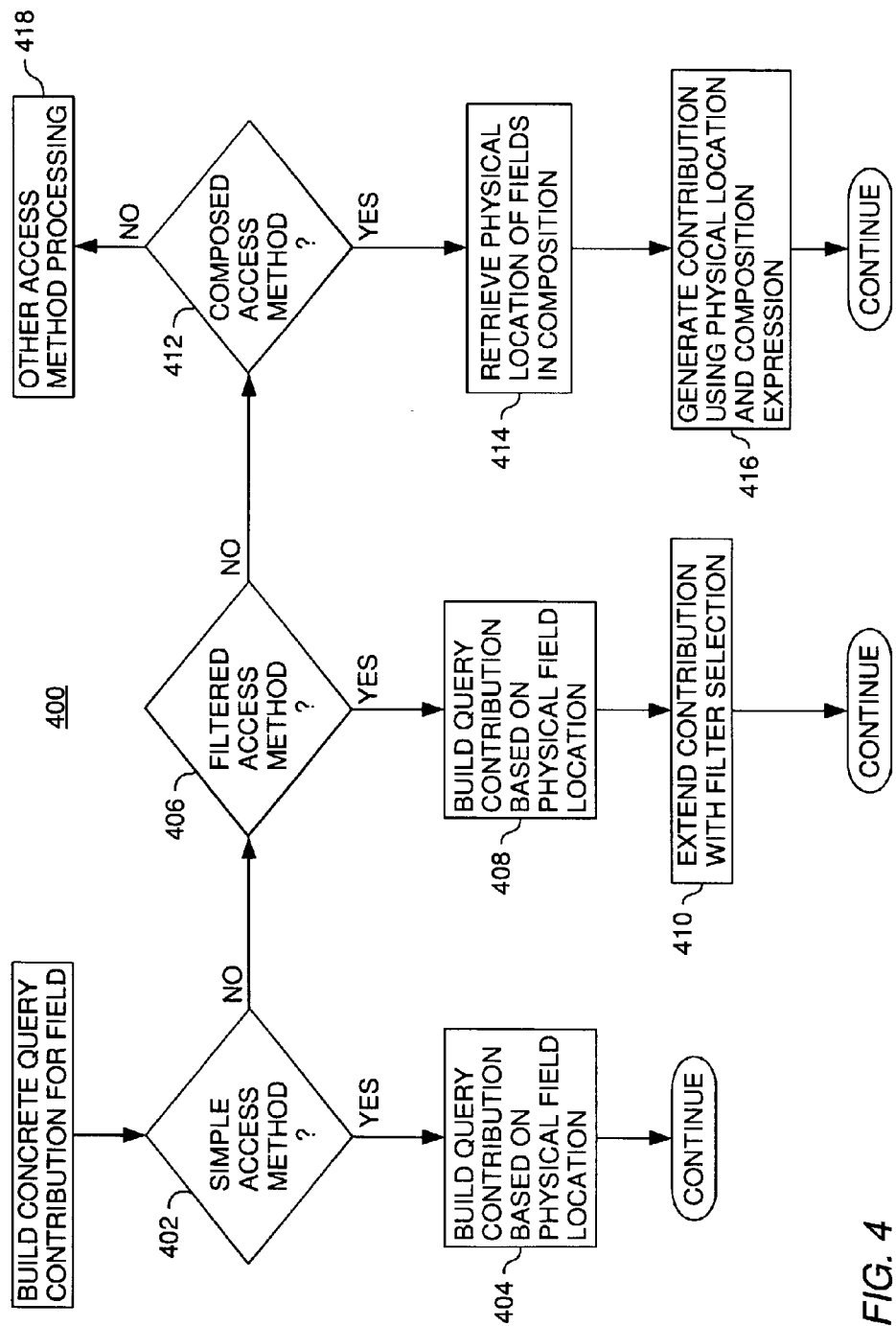

One embodiment of a method 400 for building a Concrete Query Contribution for a logical field according to steps 310 and 318 is described with reference to FIG. 4. At step 402, the method 400 queries whether the access method associated with the current logical field is a simple access method. If so, the Concrete Query Contribution is built (step 404) based on physical data location information and processing then continues according to method 300 described above. Otherwise, processing continues to step 406 to query whether the access method associated with the current logical field is a filtered access method. If so, the Concrete Query Contribution is built (step 408) based on physical data location information for some physical data entity. At step 410, the Concrete Query Contribution is extended with additional logic (filter selection) used to subset data associated with the physical data entity. Processing then continues according to method 300 described above.

If the access method is not a filtered access method, processing proceeds from step 406 to step 412 where the method 400 queries whether the access method is a composed access method. If the access method is a composed access method, the physical data location for each sub-field reference in the composed field expression is located and retrieved at step 414. At step 416, the physical field location information of the composed field expression is substituted for the logical field references of the composed field expression, whereby the Concrete Query Contribution is generated. Processing then continues according to method 300 described above.

If the access method is not a composed access method, processing proceeds from step 412 to step 418. Step 418 is representative of any other access methods types contemplated as embodiments of the present invention. However, it should be understood that embodiments are contemplated in which less then all the available access methods are implemented. For example, in a particular embodiment only simple access methods are used. In another embodiment, only simple access methods and filtered access methods are used.

According to aspects of the invention, the data modeling component 150 of FIG. 1 facilitates architecting a relationship between a physical representation of data and a logical representation of the data. In one aspect, the data repository abstraction component 132 is created/modeled with no reference to a particular physical layout. Assuming some minimal amount of information in the data repository abstraction component 132 (e.g., field-to-field relationships and field type information) a physical implementation can be created according to a desired schema (e.g., relational or XML).

In another aspect, the data repository abstraction component 132 is used to create a set of tables for some existing data. A database schema can be generated using the table/column and relationship information within the data repository abstraction component 132. Information about the original underlying physical data (including data type and length) can be used to re-create the original environment or to optimize it for use with the data repository abstraction component 132. An example of optimization would be to change numerical fields into character fields if the way in which the data is typically, or always, displayed and queried is more appropriate as character data.

In still another aspect, a data repository abstraction component 132, which abstractly defines existing physical data, may be used to reorganize the existing data for purposes of optimization. This ability may be particularly useful where, for example, an instance of a data repository abstraction component 132 is built over a data warehouse created from various sources in which the underlying tables maintained the same layout as on the source system. Often, this situation results in limitations due to the structure of the underlying data. As such limitations surface, corrective action may be taken by reorganizing the data to achieve optimization in the manner in which queries are built, in the size of the database and in overall performance.

Figure 5:
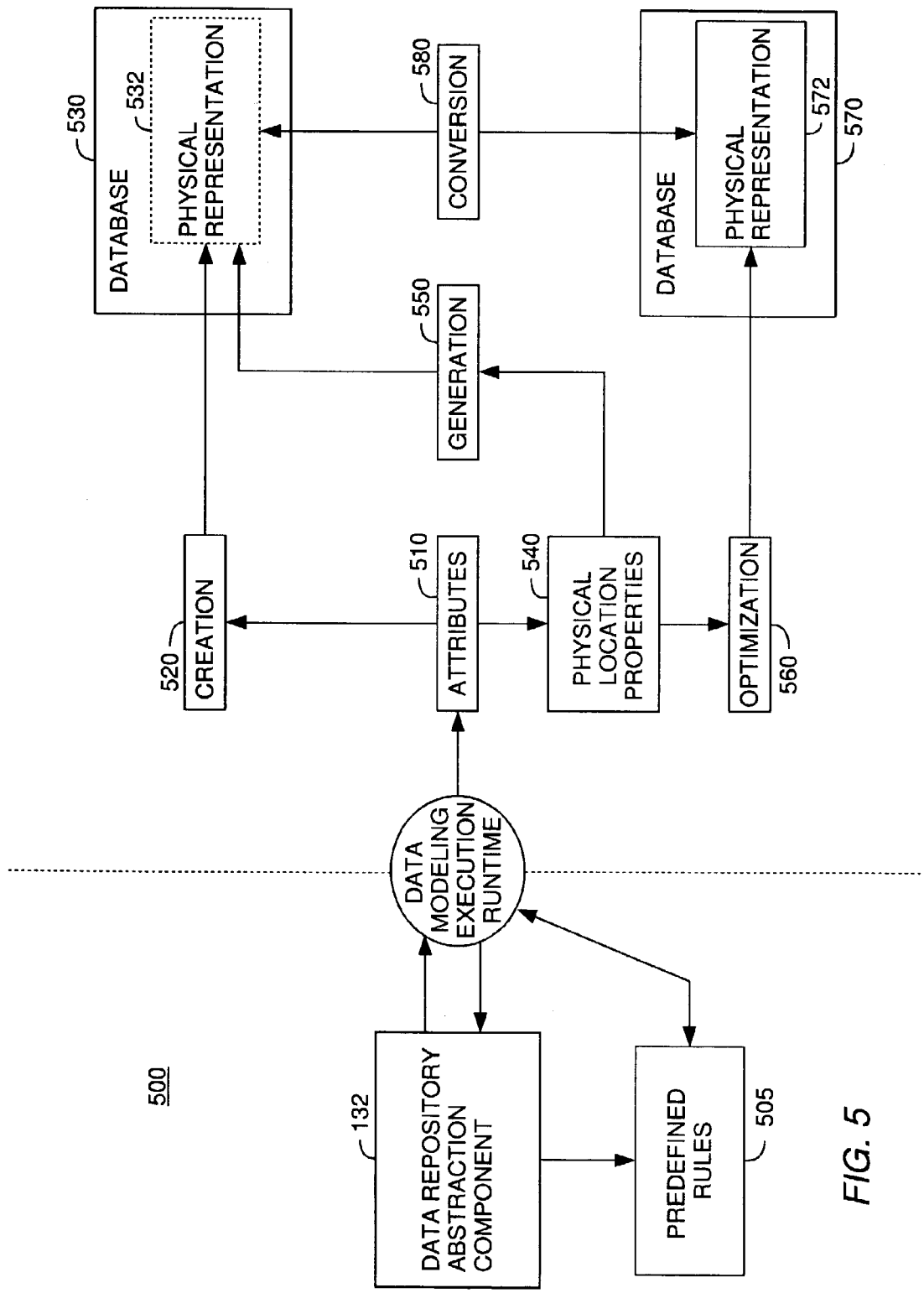
FIG. 5 is a relational view of software components of one embodiment of the invention.

Referring now FIG. 5, a relational view 500 of components of the invention is shown to illustrate a data modeling execution runtime performed by the data modeling component 150 of FIG. 1. According to FIG. 5, the logical fields defined by the data repository abstraction component 132 are used for architecting a relationship between a physical representation of the data in a database 530 or 570 and the logical representation of the data, as explained below with respect to FIG. 6. "Architecting" may refer to changing one or both of a physical representation of data (or one or more particular data structures in the underlying physical representation) and a logical representation of data (or one or more particular logical fields in the logical representation). The architecting may be used to advantage to achieve, for example: (i) a minimal size of an underlying database, (ii) support for users in creation of an initial physical representation based on a given logical representation, (iii) optimization of overall query performance due to an optimized physical representation, and (iv) a conversion of one underlying schema to another, as e.g. from SQL to XML.

In one embodiment, architecting a relationship between a physical representation and a logical representation of data is facilitated according to attributes 510 of field specifications (e.g., field specifications 208 of FIG. 2B) described above. These attributes 510 may include any variety of the metadata used to implement the architecting, including the metadata described with respect to FIG. 2B (e.g., field name attribute 210, access method attribute 212). Preferably, the field specifications 208 initially include some minimal amount of information, such as the field name attribute 210. The attributes 510 may also include physical location properties 540 abstractly describing particular data structures, i.e., particular physical entities in the underlying physical representation of the data in the database 530. In the case of a relational database, for example, the physical location properties 540 may specify a table and a column of the database 530.

If the attributes 510 do not include a reference to a physical representation of the data, i.e., the attributes 510 do not include physical location properties 540 abstractly describing particular data structures in the underlying physical representation of the data in the database 530, it is assumed that no physical representation of the data in the database 530 exists. Accordingly, a creation 520 of the physical representation 532 (illustrated in dashed lines) is performed according to predefined rules 505. For example, the predefined rules 505 may specify a relational schema, in which case one or more tables are created. The tables may subsequently be populated with data. Furthermore, the predefined rules 505 may specify use of metadata such as, e.g., a field name and a field type of a corresponding logical field (e.g., field name "FirstName" in line 004 and field type "char" in line 008 of Table II) included in the data repository abstraction 132 for creation of an associated data structure.

In one embodiment, the field name is used as name of a corresponding column in a database table and the field type is used to define the data type of the data to be included in this column.

In one embodiment, the predefined rules 505 comprise the following generic rules which may be applied when performing the creation of the physical representation: (i) taking into account data types of the logical fields; (ii) combining data structures associated with different logical fields into one database table, or generating separate data structures for different logical fields, thereby creating a separate table for each such logical field; (iii) taking into account required (but not defined) linkages between database tables to be created (for instance, it may be assumed that all logical fields in a single data repository abstraction are linked so that the corresponding data structures must also be linked, e.g., using a common unique identifier such as a foreign key); and (iv) taking into account abstract properties related to type and size of values of an underlying physical data entity. Aspects of the foregoing rules will be described in more detail below. Those skilled in the art will understand that the above is only an exemplary list of generic rules that may be modified, augmented and otherwise adapted to specific user needs. Furthermore, a single rule or a combination of rules may be applied depending on the type of data modeling that is performed.

It should be understood that the presence of physical location properties 540 in the data abstraction component 132 does not imply the necessary existence of a physical representation of physical data. Rather, the physical location properties 540 merely describe information needed by an access method to access data, which may or may not actually exist and which may or may not be organized according to a particular physical representation. As such, if it is determined that the attributes 510 include the physical location properties 540, it is then determined whether the physical representation actually exists. For instance, an attempt may be made to retrieve a physical entity of data from the physical representation according to the values of the physical location properties 540. If it is determined that the physical representation does not exist (e.g., the data cannot be retrieved), a generation 550 of the physical representation 532 is performed according to the predefined rules 505. More specifically, the physical representation 532 is generated on the basis of the physical location properties 540 and their respective values.

In contrast, if the attributes 510 include the physical location properties 540 and the physical representation already exists, e.g., physical representation 572 in the database 570, an optimization 560 may be performed by applying the predefined rules 505 for tuning the underlying physical representation for, e.g., optimal performance and/or optimal size. It should be noted that the optimization 560 may also be performed after or in combination with the creation 520 or the generation 550.

Moreover, a conversion 580 from the existing physical representation 572 in the database 570 to the physical representation 532 in the database 530 may be performed. This conversion 580 may be performed in the context of the generation 550 or optimization 560.

Once a relationship between a physical representation of data and a logical representation of the data (defined by the data repository abstraction component 132) has been architected, logical queries may be executed to access the data. In particular, logical queries are converted to corresponding physical queries, which are consistent with the physical representation of the data. This conversion is the responsibility of the runtime component 134.

Figure 6:
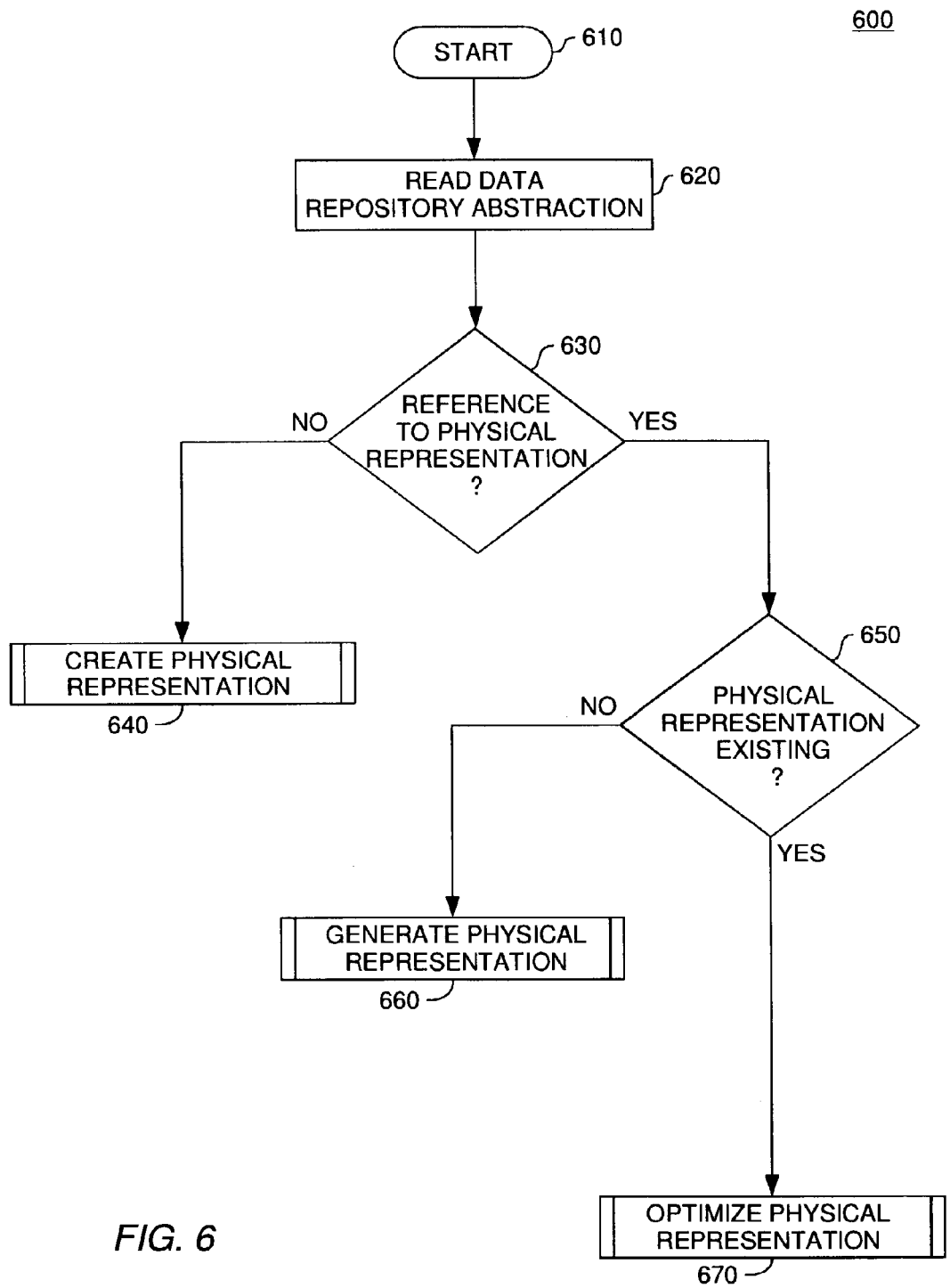
FIGS. 6–9 are flow charts illustrating the operation of a data modeling component.

FIG. 6 shows an illustrative data modeling runtime method 600 exemplifying one embodiment of the operation of the data modeling component 150. The method 600 is entered at step 610 when the data modeling component 150 receives as input a data repository abstraction (such as the data repository abstraction 132 shown in FIG. 2). At step 620, the data modeling component 150 reads and parses the data abstraction component 132 and locates attributes (e.g., attributes 510 of FIG. 5) of logical fields defined by the data repository abstraction 132. At step 630, the data modeling component 150 determines whether the attributes of one or more logical fields indicate a reference to an underlying physical representation of data. More specifically, the data modeling component 150 determines whether the attributes of the logical fields include access method attributes (e.g., one of access methods 212 of FIG. 2) having physical location properties (e.g., physical location properties 540 of FIG. 5) pointing to physical entities of data in a corresponding physical representation of the data. If it is determined that the attributes do not indicate such a reference to an underlying physical representation of the data, a physical representation is created (e.g., creation 520 of the physical representation 532 in FIG. 5) for the data repository abstraction 132 at step 640 on the basis of the logical representation defined by the logical fields and using predefined rules (e.g., predefined rules 505 of FIG. 5), as explained below with reference to FIG. 7.

If it is determined that the attributes indicate such a reference to an underlying physical representation of the data, the data modeling component 150 determines at step 650 whether the physical representation of the data actually exists. For example, the data modeling component 150 may take steps attempting to access the data of the referenced physical representation. If the data cannot be successfully accessed, it is determined that the physical representation does not exist. If it is determined that the underlying physical representation of the data does not exist, the data modeling component 150 uses the values of the physical location properties and predefined rules to perform a generation (e.g., generation 550 of the physical representation 532 in FIG. 5) of the physical representation of the data at step 660. The values of the physical location properties may indicate, e.g., a name of a database table, a name of a column in the database table, a type of a value comprised in the column or a size of the value and so forth. Thus the physical representation for the data repository abstraction 132 is generated on the basis of the logical representation defined by the logical fields, as explained below with reference to FIG. 8.

Figure 9:
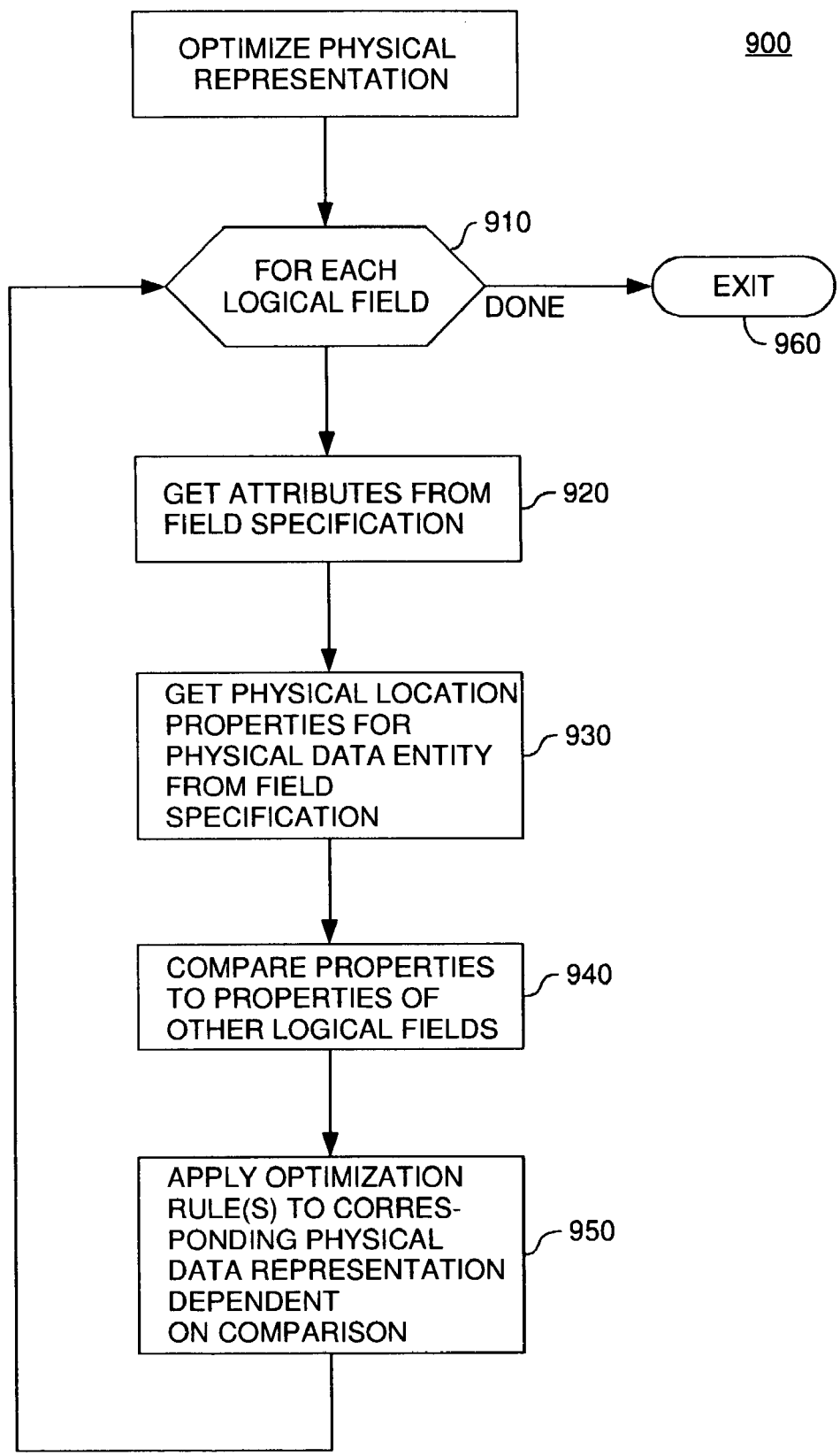

If it is determined that the underlying physical representation of the data exists, i.e., the data structures exist, the data modeling component 150 uses the values of the physical location properties and predefined rules to access the underlying physical representation of the data to perform an optimization (e.g. optimization 560 of the physical representation 572 in FIG. 5) at step 670, as explained below with reference to FIG. 9.

Figure 7:
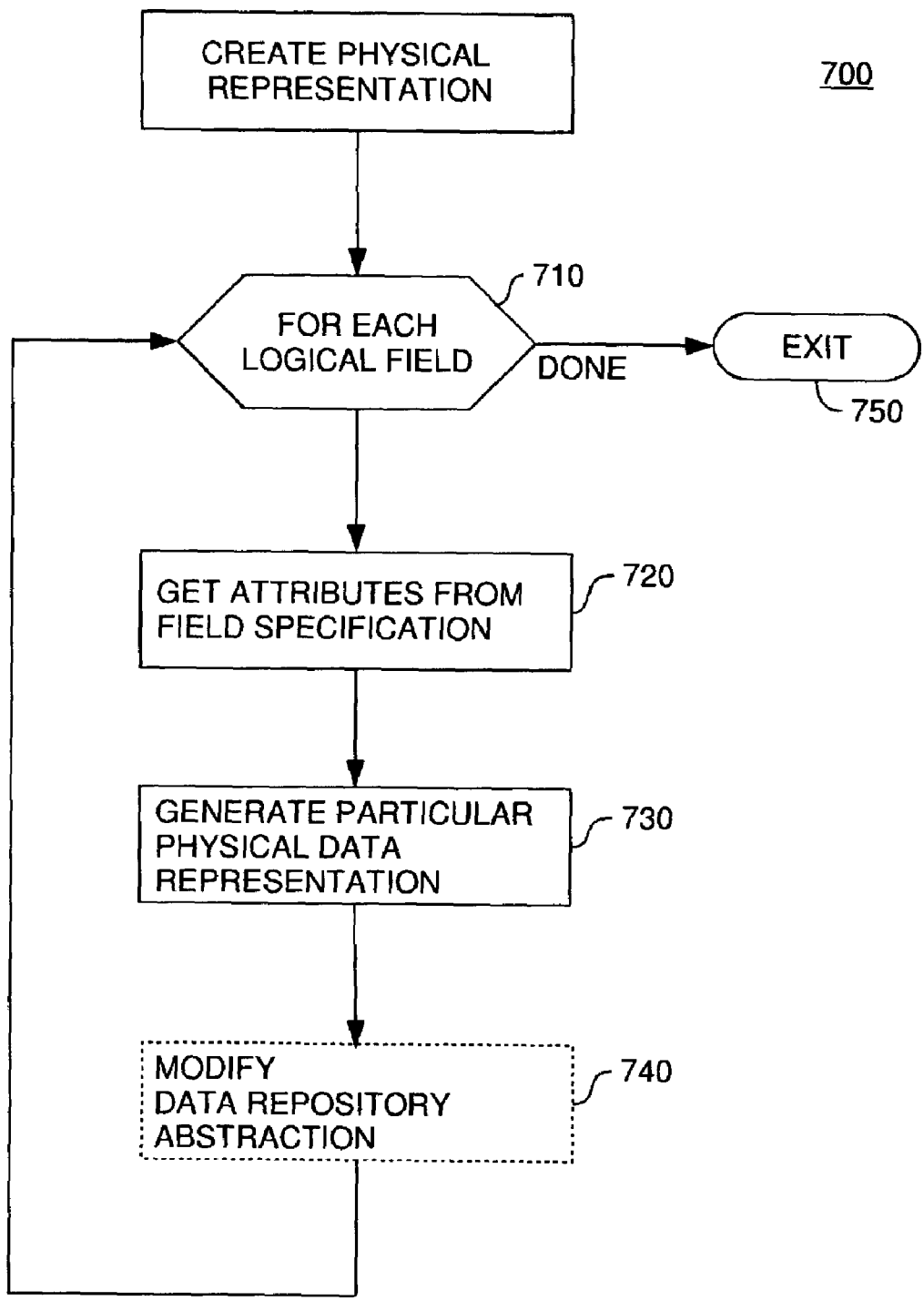

One embodiment of a method 700 for creating a physical representation according to step 640 is described with reference to FIG. 7. At step 710, the method 700 enters a loop (defined by steps 710, 720 and 730) to create a data structure for each logical field defined by a data repository abstraction (e.g., data repository abstraction 132 of FIG. 2). The steps 720 and 730 will be explained by way of example with reference to the illustrative Data Repository Abstraction shown in Table III below. By way of illustration, the illustrative Data Repository Abstraction in Table III is defined using XML. However, any other language may be used to advantage.

TABLE III

DATA REPOSITORY ABSTRACTION EXAMPLE

```
001    <?xml version="1.0"?>
002    <DataRepository>
003        <Field queryable="Yes" name="Clinic Number" displayable="Yes"
004          multiValue="Yes" multiSelect="No" authorization="Research">
005            <Type baseType="char" typeLength="128"></Type>
006            <Description>ABC Clinic Number</Description>
007        </Field>
008        <Field queryable="Yes" name="Last Name" displayable="Yes"
009          multiValue="Yes" multiSelect="No" authorization="Research">
010            <Type baseType="char" typeLength="128">
011                <TypeAttr name="UpperCaseCompare" value="Yes" />
012                <TypeAttr name="UpperCaseValue" value="Yes" />
013            </Type>
014            <Description></Description>
015        </Field>
016        <Field queryable="Yes" name="Diagnosis" displayable="Yes"
017          multiValue="Yes" multiSelect="Yes" authorization="Research">
018            <Type baseType="char" typeLength="128">
019                <UserDefined name="Diagnosis" />
020            </Type>
021        </Field>
022    </DataRepository>
```

In the following explanations it is assumed that the Data Repository Abstraction shown in Table III is used to create a relational schema as physical data representation. Illustratively, the data repository abstraction shown in Table III includes three field specifications (lines 003–007, lines 008–015 and lines 016–021) defining three different logical fields. For the logical field defined in lines 003–007, the method 700 enters the loop at step 710 and determines at step 720 the attributes and included abstract properties contained in the field specification. Preferably, at step 720 the data modeling component 150 determines only the values of physical location properties. Accordingly, the data modeling component 150 locates the attributes "Field" and "Type" having the abstract properties "queryable", "name", "displayable", "multiValue", "multiSelect", "baseType" and "typeLength" and so forth. By way of example, the abstract property "name" indicates a name of the corresponding logical field and "multiValue" indicates whether a given record associated with the logical field may include more than one different values. Furthermore, the data modeling component 150 determines the values of physical location properties "name", "baseType" and "typeLength". The values of these physical location properties are "Clinic Number" for the "name" property, "char" for the "baseType" property and "128" for the "typeLength" property. At step 730, the data modeling component 150 applies a first rule to create a data structure for a corresponding physical data entity. As no reference to an underlying physical representation is provided, the data modeling component 150 applies a first rule to create a corresponding first database table, if such table has not already been created in a previous execution of the loop. The database table is named according to a naming convention determined by the applied first rule. Accordingly, in the context of a relational database environment, a table "TABLE1" is created. Furthermore, the data modeling component 150 applies a second rule to create, on the basis to the determined values of the physical location properties, a column "CLINIC_NUMBER" in the database table "TABLE1". This column "CLINIC_NUMBER" is suitable to receive "VARCHAR" characters having a length of "128". Furthermore, as it is assumed that a relational schema should be created, each database table needs a unique identifier to uniquely identify records in the table. Such a unique identifier may be used as a foreign key to relate different tables in the database to each other within the relational schema. Accordingly, the data modeling component 150 applies a third rule to create the unique identifier, if the unique identifier has not already been created in a previous execution of the loop. Thus, the data modeling component 150 creates unique integer identifier "TABLE1_ID".

In summary, the data modeling component 150 creates the following database table when executing the loop defined by steps 710, 720 and 730 for the field specification in lines 003–007:

TABLE1:
INT TABLE1_ID;
VARCHAR(128) CLINIC_NUMBER;

wherein "TABLE1" is the created table name, "INT TABLE1_ID" is the created unique integer identifier and "VARCHAR(128) CLINIC_NUMBER" represents the data structure corresponding to the logical field. More specifically, the data structure corresponds to a column named "CLINIC_NUMBER" in the table "TABLE1" that contains "VARCHAR" values having a length of "128".

According to the data repository abstraction example of Table 111, the method 700 executes the loop defined by steps 710, 720 and 730 three times, creates three different data structures for an underlying physical representation having three database tables and exits at step 750. However, in one embodiment the data modeling component 150 determines at step 720 whether physical data entities corresponding to different logical fields may be grouped in a single table. To this end, the data modeling component 150 uses the abstract property "multiSelect" of the attribute "Field" and applies a rule to group logical fields that are "MultiSelect=No" together and those that are "MultiSelect=Yes" together. "MultiSelect=No" indicates that each record in the corresponding physical data entity exists only once and, therefore, the corresponding physical data entity may be grouped. In the data repository abstraction example of Table III, the field specification in lines 003–007 contains an abstract property "MultiSelect" having the value "No". The field specification in lines 008–015 also contains a "MultiSelect=No" value. Thus, when executing the loop defined by steps 710, 720 and 730 for the field specification in line 008–015, the data modeling component 150 determines at step 720 that the corresponding data structure, i.e., the column in the database table, may be included in the database table created as described above during the first execution of the loop. In summary, the data modeling component 150 generates the following database tables when performing the method 700 for the data repository abstraction of Table III:

TABLE1:
INT TABLE1_ID;
VARCHAR(128) CLINIC_NUMBER;
VARCHAR(128) LAST_NAME;
TABLE2:
INT TABLE1_COR;
INT TABLE2_ID;
VARCHAR(128) DIAGNOSIS;

It should be noted that a second table "TABLE2" has been generated for the field specification in lines 016–021, as this field specification contains a "MultiSelect=Yes" value indicating that each record in the corresponding physical data entity may exist multiple times. Furthermore, it can be seen that an assumption is made that "TABLE1" and "TABLE2" have to correlate somehow. In the present example this assumption is made as "TABLE1" and "TABLE2" are associated with the same data repository abstraction component 132. If, for instance, in one embodiment the data repository abstraction component defines two or more categories for grouping plural logical fields, the assumption may be made that logical fields and corresponding physical data entities grouped in the same category should be correlated. Accordingly, a correlation integer identifier "INT TABLE1_COR" has been added to "TABLE2". To achieve correlation, the identifier "INT TABLE1_COR" is matched up with the identifier "INT TABLE1_ID".

The data repository abstraction of Table III can subsequently be updated with appropriate access methods and relation information (an example of which is shown below in lines 034–043 of Table IV) needed to relate the created tables to each other. This allows for creating abstract queries (e.g., abstract query 202 of FIG. 2) against the physical data entities in the database using the updated data repository abstraction. Updating the data repository abstraction could be performed separately for each logical field when the loop defined by steps 710, 720 and 730 is completed, as illustrated with a step 740 in dashed lines.

One embodiment of a method 800 for generating data structures for physical data according to step 660 is described with reference to FIG. 8. At step 810, the method 800 enters a loop (defined by steps 810, 820, 830 and 840) to generate for each logical field defined by a data repository abstraction (e.g., data repository abstraction 132 of FIG. 2) a corresponding data structure using physical location properties defined by the corresponding logical field. Various processing steps performed during execution of the loop correspond to those described above with reference to FIG. 7.

The steps 820, 830 and 840 will be explained by way of example with reference to the illustrative Data Repository Abstraction shown in Table IV below. By way of illustration, the illustrative Data Repository Abstraction in Table IV is defined using XML. However, any other language may be used to advantage.

More specifically, in a relational database environment the data modeling component 150 generates a databastable "WHCLINICMAP" having a column "MCN". As defined in

TABLE IV

DATA REPOSITORY ABSTRACTION EXAMPLE

```
001   <?xml version="1.0"?>
002   <DataRepository>
003       <Field queryable="Yes" name="Clinic Number" displayable="Yes"
004           multiValue="Yes" multiSelect="No" authorization="Research">
005           <AccessMethod>
006               <Simple columnName="MCN"
007                   tableName="WHCLINICMAP"></Simple>
008           </AccessMethod>
009           <Type baseType="char" typeLength="10"></Type>
010           <Description>ABC Clinic Number</Description>
011       </Field>
012       <Field queryable="Yes" name="Last Name" displayable="Yes"
013           multiValue="Yes" multiSelect="No" authorization="Research">
014           <AccessMethod>
015               <Simple columnName="LAST_NM"
016                   tableName="WHDEMOGRAPHIC"></Simple>
017           </AccessMethod>
018           <Type baseType="char" typeLength="40">
019               <TypeAttr name="UpperCaseCompare" value="Yes" />
020               <TypeAttr name="UpperCaseValue" value="Yes" />
021           </Type>
022           <Description></Description>
023       </Field>
024       <Field queryable="Yes" name="DIAGNOSIS" displayable="Yes"
025           multiValue="Yes" multiSelect="Yes" authorization="Research">
026           <AccessMethod>
027               <Simple columnName="DIAGNOSIS"
028                   tableName="WHHEALTHQUEST"></Simple>
029           </AccessMethod>
030           <Type baseType="char" typeLength="6">
031               <UserDefined name="Diagnosis" />
032           </Type>
033       </Field>
034       <Link id="reg2clinicmap" source="WHDEMOGRAPHIC"
035           target="WHCLINICMAP" type="LEFT" sourceCardinality="one"
036           targetCardinality="one">
037           <LinkPoint source="WHKEY" target="WHKEY" />
038       </Link>
039       <Link id="reg2hquest" source="WHDEMOGRAPHIC"
040           target="WHHEALTHQUEST" type="LEFT" sourceCardinality="one"
041           targetCardinality="many">
042           <LinkPoint source="WHKEY" target="WHKEY" />
043       </Link>
044   </DataRepository>
```

Illustratively, the data repository abstraction shown in Table IV includes three field specifications (lines 003–011, lines 012–023 and lines 024–033) defining three different logical fields. For the logical field defined in lines 003–011, the method 800 enters the loop at step 810 and locates at step 820 the attributes contained in the field specification. At step 830, the data modeling component 150 retrieves the abstract properties from the located attributes to determine (i.e., identify) the physical location properties (e.g., physical location properties 540 of FIG. 5) there from. For example, the data modeling component 150 locates the access method attribute in lines 005–008 of the field specification having the value "Simple" and the abstract properties "columnName" and "tableName". Then, the data modeling component 150 determines the values "MCN" and "WHCLINICMAP" from these abstract properties, respectively. At step 840, the data modeling component 150 identifies and applies rules (e.g., predefined rules 505 of FIG. 5) which map the determined values to the data structure on the basis of the determined values of the physical location properties, thereby generating the underlying physical representation.

the field specification at lines 003–011, the data type for the fields of the column is character as specified by the property "char", and the character length for the fields is ten (10) as given by the expression "typeLength='10'".

In addition to field specifications, the data repository abstraction may include metadata such as relation information for linking underlying data structures of physical data entities, like database tables, to be created. More specifically, the relation information defines correlations between different tables in the database and identifiers used to correlate the tables. Illustratively, the data repository abstraction shown in Table IV includes relation information in lines 034–038 and lines 039–043.

For instance, from the relation information in lines 034–038 (specifically, the abstract properties "target" of attributes "Link" and "LinkPoint"), the data modeling component 150 determines the abstract property "source" having the value "WHCLINICMAP" from the attribute "Link". Furthermore, the data modeling component 150 determines the value "WHKEY" of the abstract property "source" from the attribute "LinkPoint" which indicates a unique identifier identifying records in the table. Accordingly, the data modeling component 150 generates the following database table when executing the loop defined by steps 810, 820, 830 and 840 for the field specification in lines 003–011:
WHCLINICMAP
INT WHKEY;
CHAR(10) MCN;

According to the data repository abstraction example of Table IV, the method 800 executes the loop defined by steps 810, 820, 830 and 840 three times, generates three data structures in an underlying physical representation having three database tables and exits at step 850. In summary, the data modeling component 150 generates the following database tables when performing the method 800 for the data repository abstraction of Table IV:
WHDEMOGRAPHIC
INT WHKEY;
CHAR(40) LAST_NM;
WHCLINICMAP
INT WHKEY;
CHAR(10) MCN;
WHHEALTHQUEST
INT WHKEY;
CHAR(6) DIAGNOSIS;

One embodiment of a method 900 for optimizing, i.e., reorganizing, a physical representation according to step 670 is described with reference to FIG. 9. At step 910, the method 900 enters a loop (defined by steps 910, 920, 930, 940 and 950) to optimize an existing physical representation. The existing physical representation is optimized using abstract properties of physical data entities defining the physical representation as well as using parameters of the physical data entities. Each abstract property is defined by a corresponding logical field. Various processing steps performed during execution of the loop correspond to those described above with reference to FIGS. 7 and 8. Accordingly, for brevity, reference is made back to FIGS. 7 and 8, where appropriate. The steps 920, 930, 940 and 950 will be explained by way of example with reference to the illustrative Data Repository Abstraction shown in Table IV above.

Figure 8:
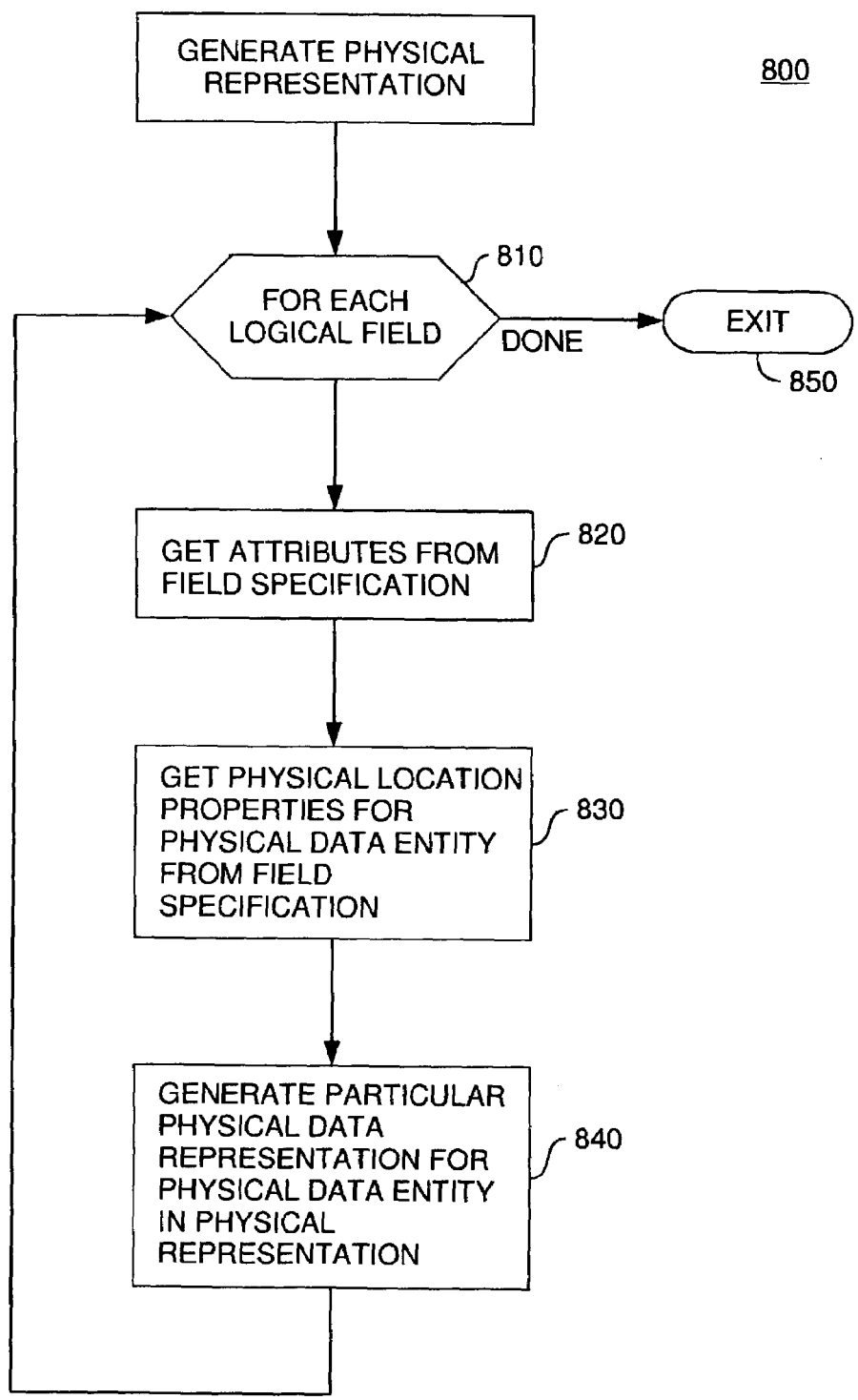

Steps 920 and 930 correspond to steps 820 and 830 of FIG. 8, respectively. At step 940 abstract properties of different logical fields are compared to determine whether different data structures and, thus, at least a portion of the physical data entities corresponding to the logical fields may be combined. More specifically, for each logical field having a "MultiSelect=No" value, the data modeling component 150 determines whether the associated database tables are the same. If they are, processing exits and if they are not, the data modeling component 150 determines the relation between the different tables and applies a rule (e.g., predefined rules 505 of FIG. 5) for combining at least a portion thereof in one single table.

For instance, in the example described above, the logical fields corresponding to lines 003–011 and 012–023 both contain "MultiSelect=No" values. However, two different tables, i.e., tables "WHDEMOGRAPHIC" and "WHCLINICMAP" have been created. From the relation information in lines 032–036 (specifically, from the abstract property "target" of the attributes "Link" and "LinkPoint"), the data modeling component 150 identifies the value "WHKEY", which indicates a unique identifier identifying records in the tables "WHDEMOGRAPHIC" and "WHCLINICMAP" with a one-to-one relationship (i.e. with a target and a source cardinality of "one"). Accordingly, the data modeling component 150 optimizes the physical representation including three tables as shown above by reorganizing, i.e., in the present example by combining the tables "WHDEMOGRAPHIC" and "WHCLINICMAP" into the table "WHDEMOGRAPHIC" (at step 950), while the "WHHEALTHQUEST" table remains unchanged. The resulting "WHDEMOGRAPHIC" table is as follows:
WHDEMOGRAPHIC
INT WHKEY;
CHAR(40) LAST_NM;
CHAR(10) MCN;

This reduces the overall size of the database and the complexity of abstract queries to be executed by reducing the number of relations, i.e. the joining of different tables in queries.

Additionally, the data repository abstraction of Table IV could be updated with respect to the optimized physical representation to enable creating abstract queries (e.g., abstract query 202 of FIG. 2) against the optimized physical representation. Accordingly, the attribute "Link" having the value "id=reg2clinicmap" in lines 034–038 of the data repository abstraction example of Table IV can be removed and the access method in line 007 can be modified to point to table "WHDEMOGRAPHIC" instead of pointing to table "WHCLINICMAP".

In various embodiments, the invention provides numerous advantages over the prior art. In one aspect, advantages are achieved by defining a loose coupling between the application query specification and the underlying physical representation. Rather than encoding an application with specific table, column and relationship information, as is the case where SQL is used, the application defines data query requirements in a more abstract fashion that are then bound to a physical representation at runtime. The loose query-data coupling of the present invention enables requesting entities (e.g., applications) to function even if the underlying data representation is modified or if the requesting entity is to be used with a completely new physical representation than that used when the requesting entity was developed. In the case where a given physical representation is modified or restructured, the corresponding data repository abstraction is updated to reflect changes made to the underlying physical data model. In contrast, in the case where a given logical representation is modified or restructured, the corresponding physical representation may be updated to reflect changes made to the logical representation. The same set of logical fields is available for use by queries, and has merely been bound to different entities or locations in physical data model. As a result, requesting entities written to the abstract query interface continue to function unchanged, even though the corresponding physical data model has undergone significant change. In the event a requesting entity is to be used with a completely new physical representation than that used when the requesting entity was developed, the new physical data model may be implemented using the same technology (e.g., relational database) but following a different strategy for naming and organizing information (e.g., a different schema). The new schema will contain information that may be mapped to the set of logical fields required by the application using simple, filtered and composed field access method techniques. Alternatively, the new physical representation may use an alternate technology for representing similar information (e.g., use of an XML based data repository versus a relational database system). In either case, existing requesting entities written to use the abstract query interface can easily migrate to use the new physical representation with the provision of an alternate data repository abstraction which maps fields referenced in the query with the location and physical representation in the new physical data model. Moreover, according to the invention physical representations may be converted from one to another on the basis of associated logical representations. Specifically, maintenance of database schemas is simplified as logical representations may be maintained instead of physical representations, thereby improving ease-of-use of complicated database schemas.

In another aspect, the invention facilitates ease-of-use for the application builder and the end-user. Use of an abstraction layer to represent logical fields in an underlying data repository enables an application developer to focus on key application data requirements without concern for the details of the underlying data representation. As a result, higher productivity and reduced error rates are achieved during application development. With regard to the end user, the data repository abstraction provides a data filtering mechanism, exposing pertinent data and hiding nonessential content that is not needed by a particular class end-user developing the given query.

It should be noted that any reference herein to particular values, definitions, programming languages and examples is merely for purposes of illustration. Accordingly, the invention is not limited by any particular illustrations and examples. Further, while aspects of the invention are described with reference to SELECTION operations, other input/output operation are contemplated, including well-known operations such as ADD, MODIFY, INSERT, DELETE and the like. Of course, certain access methods may place restrictions on the type of abstract query functions that can be defined using fields that utilize that particular access method. For example, fields involving composed access methods are not viable targets of MODIFY, INSERT and DELETE.

While the foregoing is directed to embodiments of the present invention, other and further embodiments of the invention may be devised without departing from the basic scope thereof, and the scope thereof is determined by the claims that follow.

What is claimed is:

1. A computer-implemented method of providing a relationship between a physical representation of data in one or more databases and a logical representation of the data, comprising:
    providing the logical representation defining logical fields describing respective data stored in the database; and then
    providing, on the basis of the logical representation, the physical representatian for the data to establish a relationship between the logical representation and the physical representation, whereby the logical fields defined by the logical representation provide an abstract view of the data and map logical fields of abstract queries to the respective data in the database; wherein providing the physical representation for the data comprises at least one of:
        (i) mapping a first schema to a second schema, the physical representation being an-anged according to the second schema;
        (ii) creating the physical representation; and
        (iii) reorganizing the physical representation.

2. The method of claim 1, wherein the first and second schemas are one of a relational, a hierarchical and an XML database schema.

3. The method of claim 1, wherein creating the physical representation comprises creating the respective data corresponding to the defined logical fields.

4. The method of claim 1, wherein providing the logical representation is done prior to creating data.

5. The method of claim 1, wherein the physical representation comprises a plurallty of data structures of physical data entities associated with the defined logical fields, each physical entity comprising a portion of the respective data, and wherein reorganizing the physical representation comprises:
    determining at least two related data structures; and
    combining the at least two data structures.

6. The method of claim 1, wherein reorganizing the physical representation comprises:
    converting the physical representation into a new physical representation.

7. The method of claim 1, wherein the database is one of a relational and an XML type database.

8. A computer-implemented method of architecting a relationship between a physical representation of data in a database and a logical representation of the data, the physical representation having a plurality of physical entities representing related data in the database, the method comprising:
    providing a logical representation defining logical fields, each logical field describing physical location properties of a physical data entity to be associated with the logical field;
    for each logical field:
        determining the physical location properties of the physical data entity to be associated with the logical field; and
        providing a data structure on the basis of the determined physical location properties; and
        associating the provided data structures with the physical representation;
    whereby a relationship between the logical representation and the physical representation is effected.

9. The method of claim 8, wherein providing the physical entity comprises creating the physical entity corresponding to the defined logical field.

10. The method of claim 8, wherein the database is one of a relational and an XML type database.

11. A computer readable storage medium containing a program which, when executed, performs an operation of architecting a relationship between a physical representation of data in a database and a logical representation of the data, comprising:
    analyzing the logical representation defining logical fields, each logical field providing to users an abstract view of related data stored in the database and adapted for mapping logical fields of abstract queries to respective data in the database; and
    generating, on the basis of the logical representation, the physical representation for the data; whereby a relationship between the logical representation and the physical representation is effected.

12. The computer readable storage medium of claim 11, wherein generating the physical representation comprises mapping a first schema to a second schema, wherein the physical representation is the second schema.

13. The computer readable stomps medium of claim 11, wherein the first and second schemas are one of a relational, a hierarchical and an XML database schema.

14. The computer readable storage medium of claim 11, wherein analyzing the logical representation comprises analyzing a logical representation defining logical fields describing related data stored in the database and wherein generating the physical representation comprises reorganizing the physical representation in the database.

15. The computer readable storage medium of claim 14, wherein the physical representation comprises a plurality of data structures of physical data entities associated with the defined logical fields, each physical entity comprising related data, and wherein reorganizing the physical representation comprises:
   determining at least two related data structures; and
   combining the at least two data structures.

16. The computer readable storages medium of claim 14, wherein reorganizing the physical representation comprises:
   converting the physical representation into a new physical representation.

17. The computer readable stomps medium of claim 11, wherein the database is one of a relational and an XML type database.

18. A computer readable storage medium containing a program which, when executed, performs an operation of arch infecting a relationship between a physical representation of data in a database and a logical representation of the data, the physical representation having a plurality of physical entities representing related data in the database, the operation comprising:
   for each logical field of a logical representation defining logical fields describing physical location properties of a data structure of a physical data entity to be associated with the logical field:
      determining the physical location properties; and
      generating the data structure on the basis of the determined physical location properties; and
   associating the generated data structures with the physical representation; whereby a relationship between the logical representation and the physical representation is effected.

19. The computer readable storage medium of claim 18, wherein generating the data structure comprises creating the data structure corresponding to the defined logical field.

20. The computer readable storage medium of claim 18, wherein the database is one of a relational and an XML type database.

21. A computer, comprising:
   a database for storing data; and
   a data modeling component for architecting a relationship between a physical representation of the data in the database and a logical representation of the data, the logical representation defining logical fields, each logical field providing an abstract view of related data in the database to users and mapping logical fields of abstract queries to respective related data In the database, and for generating, on the basis of the logical data representation, a physical representation for the data; whereby a relationship between the logical representation and the physical representation is effected.

22. A computer, comprising:
   a database for storing data; and
   a data modeling component configured for architecting a relationship between a physical representation of data in a database and a logical representation of the data, the logical representation defining logical fields, each logical field describing physical location properties of a physical entity to be associated with the logical field, and the physical representation having a plurality of data structures associated with physical data entities representing related data in the database, the architecting comprising: determining, for each logical field, the properties of the data structure to be associated with the logical field;
   generating a data structure on the basis of the determined physical location properties; and
   associating the generated data structures with the physical representation; whereby a relationship between the logical representation and the physical representation is effected.

23. A logical framework for modeling a data repository, the logical framework residing in memory and comprising:
   a data model comprising:
      a plurality of logical fields providing a logical view of data, the logical fields each comprising physical location properties defining a location of a data item and an access method configured to access the data Item according to the physical location properties; and
      metadata defining relation information for relating at least a portion of the data; and
   a data modeling component for architecting, according to the data model, a relationship between a physical representation of the data and a logical representation of the data as defined by the plurality of logical fields, whereby the plurality of logical fields are each mapped to respective data items of the data and whereby a relationship between the logical representation and the physical representation is effected.

24. The logical framework of claim 23, wherein the physical location properties comprise at least one of a name of a database table and a name of a column.

25. The method of claim 1 wherein the plurality of logical field definitions In the logical representation each comprise a logical field name, at least one location attribute identifying a location of the data corresponding to the logical field name, and a reference to an access method selected from at least two different access method types; wherein each of the different access methods types defines a different manner of exposing the data corresponding to the logical field name of the respective logical field definition.

* * * * *